US009652165B2

(12) United States Patent
Ikegaya et al.

(10) Patent No.: US 9,652,165 B2
(45) Date of Patent: May 16, 2017

(54) STORAGE DEVICE AND DATA MANAGEMENT METHOD

(71) Applicant: Hitachi, Ltd., Tokyo (JP)

(72) Inventors: Naoko Ikegaya, Tokyo (JP); Tomohiro Kawaguchi, Tokyo (JP); Kohei Tatara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 130 days.

(21) Appl. No.: 14/759,983

(22) PCT Filed: Mar. 21, 2013

(86) PCT No.: PCT/JP2013/058119
§ 371 (c)(1),
(2) Date: Jul. 9, 2015

(87) PCT Pub. No.: WO2014/147794
PCT Pub. Date: Sep. 25, 2014

(65) Prior Publication Data
US 2015/0355857 A1  Dec. 10, 2015

(51) Int. Cl.
G06F 12/00  (2006.01)
G06F 3/06  (2006.01)

(52) U.S. Cl.
CPC ............ *G06F 3/0619* (2013.01); *G06F 3/061* (2013.01); *G06F 3/067* (2013.01); *G06F 3/0617* (2013.01);
(Continued)

(58) Field of Classification Search
CPC ......... G06F 3/067; G06F 3/0608; G06F 3/061
See application file for complete search history.

(56) References Cited

U.S. PATENT DOCUMENTS

2004/0226021 A1  11/2004  Miki et al.
2005/0050274 A1  3/2005  Araki et al.
(Continued)

FOREIGN PATENT DOCUMENTS

JP  7-319627 A  12/1995
JP  2004-334434 A  11/2004
(Continued)

OTHER PUBLICATIONS

International Search Report of PCT/JP2013/058119.

*Primary Examiner* — David X Yi
*Assistant Examiner* — Arvind Talukdar
(74) *Attorney, Agent, or Firm* — Mattingly & Malur, PC

(57) ABSTRACT

Regardless of which of the multiple storage subsystems provided with the same identification information is accessed from a plurality of host computers, multiple volumes provided with the same identification information among the storage subsystems are subjected to extent exclusion sharing. Therefore, a multiplex volume provided with the same identification information among the plurality of storage subsystems and a first storage subsystem for processing input/output requests by the channel command to the multiplex volume are provided, wherein if the channel command received from the host computer or via a control unit of a second storage subsystem is an input/output request of the multiplex volume, a control unit of the first storage subsystem determines the access authority regarding an extent range of the multiplex volume designated by the channel command, based on information on whether an input/output processing regarding the extent range is already executed based on another request.

6 Claims, 18 Drawing Sheets

(52) U.S. Cl.
CPC .......... *G06F 3/0658* (2013.01); *G06F 3/0665* (2013.01); *G06F 3/0689* (2013.01)

(56) References Cited

U.S. PATENT DOCUMENTS

| | | |
|---|---|---|
| 2007/0245106 A1 | 10/2007 | Maki et al. |
| 2008/0034005 A1 | 2/2008 | Satoyama et al. |
| 2009/0198896 A1 | 8/2009 | Maki et al. |
| 2011/0066801 A1 | 3/2011 | Sato |
| 2011/0202718 A1 | 8/2011 | Maki et al. |
| 2012/0059988 A1* | 3/2012 | Sano .................. G06F 3/0611 711/114 |
| 2012/0137096 A1 | 5/2012 | Maki et al. |

FOREIGN PATENT DOCUMENTS

| | | |
|---|---|---|
| JP | 2007-286946 A | 11/2007 |
| JP | 2012-504793 A | 2/2012 |

\* cited by examiner

Fig. 6

Extent Exclusion Control Table 420

| Virtual Storage Subsystem | Virtual VOL | Extent Range | Processing Storage Subsystem |
|---|---|---|---|
| VDKC1 | VVOL1 | A | DKC1 |
| | | B | |
| | | C | |
| . . . | . . . | . . . | . . . |

Subsystem ID Management Table 430

Logical Volume Management Table 440

Virtual Storage Allocation Management Table 450

Logical Volume Extent Exclusion Control Table 425

| Logical CU | Logical VOL | Extent Range | Lock Status |
|---|---|---|---|
| LCU1 | LDEV1 | A | Locked |
| | | B | Unlocked |
| | | C | Locked |
| . . . | . . . | . . . | . . . |

STORAGE DEVICE AND DATA MANAGEMENT METHOD

TECHNICAL FIELD

The present invention relates to a storage subsystem and a data management method in the storage subsystem, which is especially preferably applied to a storage subsystem in which volumes of multiple storage subsystems are subjected to shared accesses from multiple host computers.

BACKGROUND ART

Along with the enhancement of importance of data used in computer systems, storage operation has been developed where data is multiplexed and retained in multiple storage subsystems located at multiple sites, in order to prepare for disasters such as earth quakes and fire. Methods for multiplexing data among multiple storage subsystems include, for example, a multiplex output method where a host computer writes identical data into multiple volumes, or a remote copy method for multiplexing data among multiple storage subsystems.

According to the remote copy method, different host computers connect to storage subsystems located at different sites, respectively. Usually, the host computer located at a primary site accesses the storage subsystem located at the primary site to carry out operations, and the storage subsystem at the primary site transfers update data to the storage subsystem located at a secondary site, wherein the host computer at the secondary site will not perform output to the storage located at the secondary site. This form of operation is called an active-standby configuration. When disaster occurs at the primary site, the operation of the host computer is handed over to the secondary site, so that operation can be continued by accessing the storage subsystem located at the secondary site.

Regarding the configurations of connection between host computers and storage subsystems, one possible configuration enables multiple host computers to share the same volume in a single storage subsystem, and another possible configuration enables a single host computer to access multiple storage subsystems.

There are two types of systems in the configuration where multiple host computers access the same volume within a single storage system, one of which is a system where a clustering technique is adopted in the host computers, and the other one is a system utilizing an access exclusion technique within the storage subsystems. In the system where a clustering technique is adopted by host computers, when one host computer fails, one of the other remaining host computers takes over the operation. At this time, competition of volume accesses is generally subjected to exclusive control among host computers.

On the other hand, there are two types of methods in the system where access exclusion technique within storage subsystems is adopted, one of which is a method of reserving a usable host computer in volume units, and a method of simultaneously using different access ranges of a single volume from multiple host computers.

For example, patent literature 1 discloses an art in which information concerning extent (extent range) of an input/output processing request issued by a host processor is stored to thereby enable a storage control device to perform exclusive control on an extent-by-extent basis. If the host processor is a mainframe, the extent range is designated in the parameter of a beginning command of a command chain in which channel commands are transmitted sequentially. According to this system, exclusive sharing of volumes among storage control systems can be realized based on the extent range of a beginning command, without having to perform exclusive control of access ranges of volumes among multiple host processors.

Recently, along with the increase of data capacity, the number of storage subsystems located within a single site is increasing. Management operation becomes complex in a large-scale storage system, so that patent literature 2 discloses a storage virtualization technique in which identical storage subsystem identifiers are provided to multiple storage subsystems. Based on this storage virtualization technique, the number of storage subsystem identifications being the target of management can be reduced.

Patent literature 3 discloses an active-active configuration in which identical identifiers are provided to volumes within multiple storage subsystems, wherein a host computer is enabled to achieve the same access results by accessing any one of the multiple storage subsystems. According to patent literature 3, there is only one host computer, and the host computer issues the subsequent input/output request after the previous input/output processing is completed.

CITATION LIST

Patent Literature

[PTL 1]
US Patent Application Publication No. 2005/0050274
[PTL 2]
US Patent Application Publication No. 2008/0034005
[PTL 3]
US Patent Application Publication No. 2011/0202718

SUMMARY OF INVENTION

Technical Problem

In the above-described patent literatures 1 through 3, in order to share volumes by different operations in multiple host computers, it was necessary for the storage control system to subject volumes within a single storage subsystem to extent exclusion, or it was necessary for clustered host computers to determine the host computer capable of accessing the volume. However, patent literatures 1 through 3 lack to consider a method for enabling multiple host computers to subject the multiple volumes having identical identifiers among multiple storage subsystems to extent exclusion sharing.

For example, as described earlier, it is possible using a storage virtualization function to provide identical identifiers to multiple storage subsystems and to retain volumes having the same identifier among multiple storages, but extent exclusion can only be controlled within the volume of the storage subsystem having received the command chain from the host computer. Therefore, if multiple storages simultaneously receive different command chains related to volumes having identical identifiers, the same extent ranges of volumes having identical identifiers were accessed within the different storage subsystems, so that there was a drawback that the data retained in volumes having identical identifiers within different storage subsystems were varied.

In consideration of the problems of the prior art mentioned above, the present invention aims at providing a storage subsystem and a data management method of a storage subsystem, wherein regardless of which of the multiple storage subsystems having identical identifiers is accessed from the multiple host computers, multiple volumes having the same identifier among multiple storage subsystems can be subjected to extent exclusion sharing.

Solution to Problem

In order to solve the problems mentioned above, the present invention provides a plurality of mainframe host computers for transmitting channel commands requesting input and output of data, and a plurality of storage subsystems connected thereto via a network, wherein multiplex volumes are provided having identical identification information among the plurality of storage subsystems as volume identification information provided to host computers, the plurality of storage subsystems comprising, at least, a primary storage subsystem for processing an input/output request via a channel command with respect to the multiplex volume as a primary system and a secondary storage subsystem as a secondary system in a high availability configuration, and control units provided to the respective systems, characterized in that when a channel command received from the host computer or via a control unit of a secondary storage subsystem is an input/output request with respect to a multiplex volume, the control unit of the primary storage subsystem determines an access authority with respect to an extent range of a multiplex volume designated by the channel command, and if the access authority is acceptable, the input/output processing based on the input/output request is executed, wherein the control unit of the primary storage subsystem determines the access authority based on an information on whether input/output processing regarding the extent range is already being executed by another request or not.

According to such configuration, a plurality of host computers can simultaneously access different extent ranges of multiplex volumes having identical identification information allocated to multiple storage subsystems.

Advantageous Effects of Invention

According to the present invention, the overall throughput of the high availability (HA) system can be improved by enabling multiple storages connected to multiple host computers to simultaneously access a volume group having identical identifiers.

BRIEF DESCRIPTION OF DRAWINGS

FIG. 6 is a view showing a configuration example of an extent exclusion control table.

DESCRIPTION OF EMBODIMENTS

Now, embodiments 1 through 3, which are preferred embodiments for carrying out the present invention, will be described in order with reference to the drawings.

Embodiment 1

According to a storage system of embodiment 1, an identical identifier is provided to logical volumes (hereinafter also referred to as "logical VOL" in tables and the like) of a plurality of storage subsystems, and a single virtual volume (hereinafter also referred to as "virtual VOL" in tables and the like) is composed of the logical volumes having the same identifiers. Then, the virtual volume is subjected to extent exclusion and simultaneously used by multiple host computers.

Figure 1:
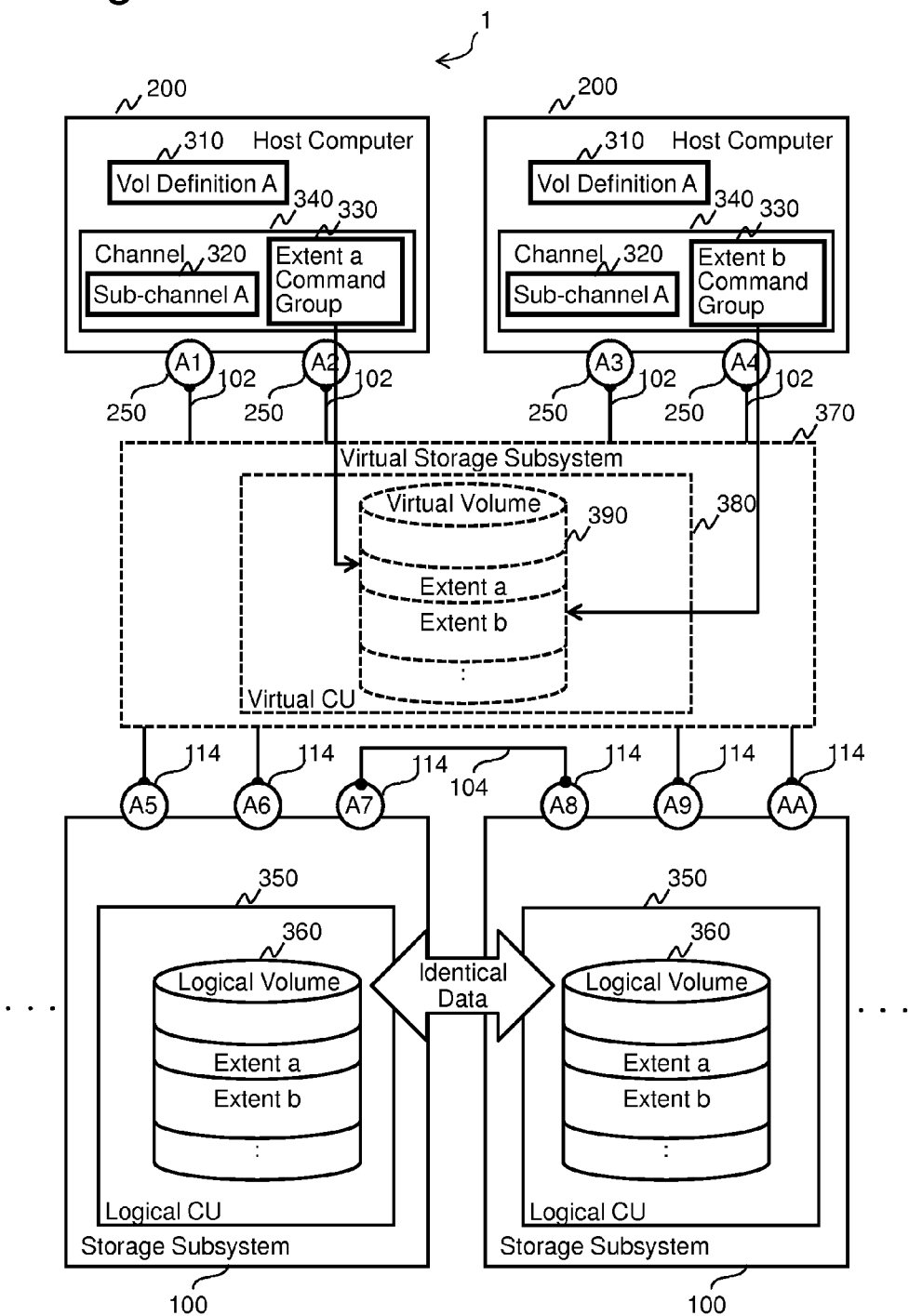
FIG. 1 is a block diagram illustrating an overall configuration of a computer system according to the present invention.

FIG. 1 is a block diagram illustrating an overall configuration of a computer system according to the present invention. A computer system 1 includes a plurality of storage subsystems 100 and a plurality of host computers 200 (such as mainframes and servers). The storage subsystem 1 can also be referred to as a storage system.

The storage subsystems 100 and the host computers 200 are coupled via a network 102. The network 102 is a data network, and if the host computer 200 is a mainframe, channel commands and transfer data are communicated via the network. A network 104 is a data network mutually connecting the storage subsystems 100.

Further, FIG. 1 is a conceptual diagram of virtual storage subsystems assembled to realize extent exclusion sharing. Each storage subsystem 100 includes one or more logical control units (hereinafter referred to as "logical CU") 350, wherein the logical CU 350 includes a plurality of logical volumes 360, which are units having divided the capacity of the storage subsystem 100.

The host computer 200 accesses the storage subsystem 100 using a configuration definition information 310 of an input/output device. Here, the configuration definition information 310 defines a connection configuration to the storage subsystem 100 and tiered information of the logical CU 350 and the logical volume 360. Further, the host computer 200 of embodiment 1 has a dedicated channel 340 for executing the input/output processing of the host computer. The channel 340 retains a sub-channel information 320 associated with the configuration definition information 310, and specifies the logical volume 360 that the host computer 200 accesses. Further, the channel 340 retains a channel command group 330 for controlling the storage subsystem 100.

A virtual storage subsystem 370 is a logical device for enabling resources of multiple storage subsystems 100 to be recognized as a single subsystem by the host computer 200. The virtual storage subsystem 370 includes one or more virtual control units (hereinafter referred to as "virtual CU") 380, wherein one or more virtual volumes 390 are composed hierarchically within the virtual CU 380. In order for the host computer 200 to access the virtual volume 390, the form of connection to the virtual storage subsystem 370 and the tiered information of the virtual CU 380 and the virtual volume 390 are defined in the configuration definition information 310 and the sub-channel 320. Further, a beginning command of a group of channel commands 330 retains information for excluding an extent range being the target of access of the virtual volume 390.

The virtual volume 390 allocates the logical volumes 360 that the multiple storage subsystems 100 have as the entity for storing data. The identification information of logical volumes 360 corresponding to the virtual storage subsystem 370 do not have to be the same among the storage subsystems 100.

Figure 2:
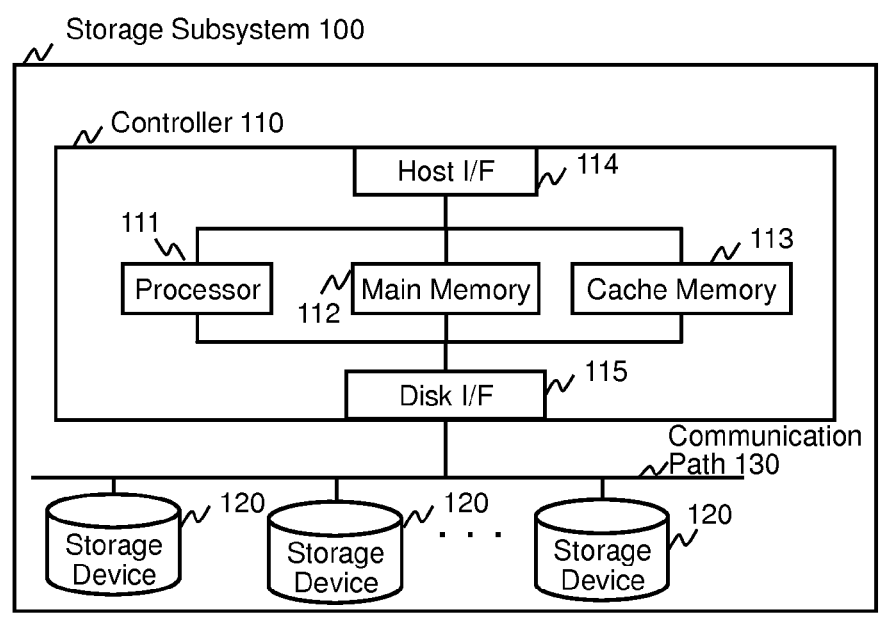
FIG. 2 is a block diagram illustrating a general configuration of a storage subsystem.

FIG. 2 is a block diagram showing the outline of configuration of the storage subsystem 100. The storage subsystem 100 has at least one controller 110 and at least one storage device 120. The storage device 120 is coupled to the controller 110 via a communication path 130. It is possible to constitute at least one parity group using the plurality of storage devices 120.

The controller 110 is composed of a processor 111, a main memory 112 and a cache memory 113, which are coupled via a host interface (hereinafter, interface is abbreviated as "I/F") 114 to a data network 102 or 104, and also coupled via a disk I/F 115 to a communication path 130.

The controller 110 controls the input/output processing of data with respect to the storage device 120 based on a command received from the host computer 200. Now, by using the cache memory 113 as a buffer, control is performed to complete the input/output processing in a shorter time than performing reading and writing of the storage device 120.

The processor 111 controls the overall operation of the storage subsystem 100. Various processes can be executed via the whole storage subsystem by executing the microprogram stored in the main memory 112 via the processor 111.

The storage devices 120 are composed, for example, of a semiconductor memory such as an SSD (Solid State Drive) which is expensive and realizes a high performance, a disk device such as an FC (Fiber Channel) disk or a SAS (Serial Attached SCSI) disk, and an inexpensive and low-performance disk device such as a SATA (Serial AT Attachment).

Figure 3:
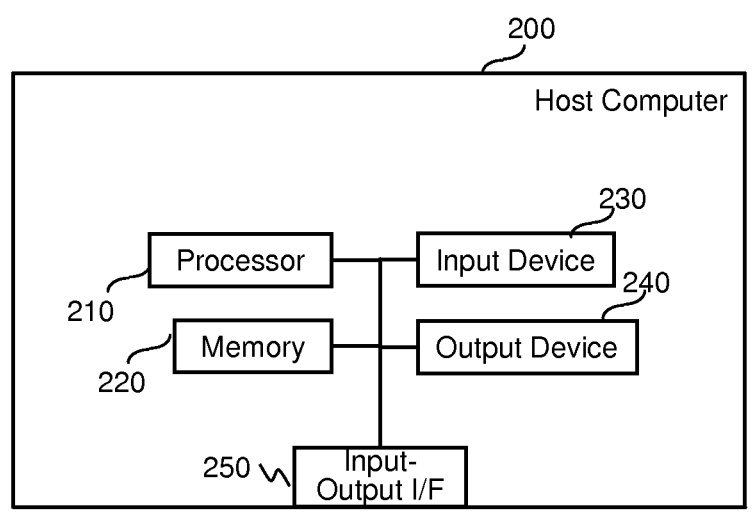
FIG. 3 is a block diagram showing a general configuration of a host computer.

FIG. 3 is a block diagram illustrating the general configuration of a host computer 200. The host computer 200 has a processor 210, a memory 220, an input device 230 and an output device 240, which are coupled to the network 102 via an input/output I/F 250. The input device 230 is a keyboard or a pointing device, for example, and the output device 240 is a display or a printer, for example.

The host computer 200 executes various applications, and when input and output (I/O) processing of data becomes necessary, the computer executes an input/output command, requests the processing of the input/output command to the storage subsystem 100, and receives a response data of the input/output command processing from the storage subsystem 100.

Figure 4:
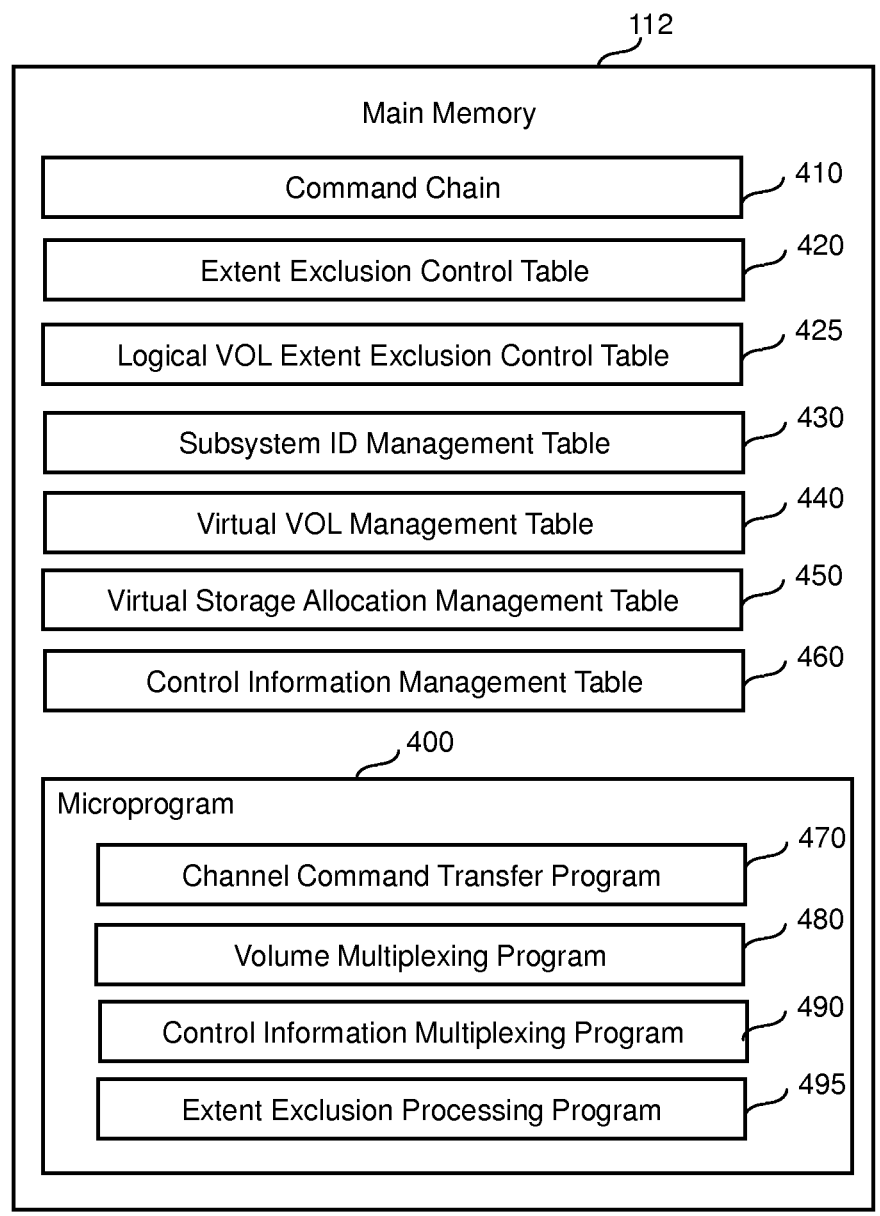
FIG. 4 is a block diagram illustrating various tables and a program stored in a main memory of the storage subsystem.

FIG. 4 is a block diagram showing various management tables and a microprogram 400 stored in the main memory 112. The management tables stored in the main memory 112 are a command chain 410, an extent exclusion control table 420, a logical volume extent exclusion control table 425, a subsystem ID management table 430, a virtual volume management table 440, a virtual storage allocation management table 450 and a control information management table 460. Further, a channel command transfer program 470, a volume multiplexing program 480, a control information multiplexing program 490 and an extent exclusion processing program 495 are stored as the microprogram 400.

Figure 5:
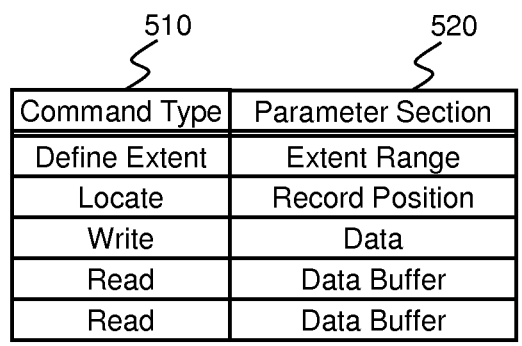
FIG. 5 is a view showing an example of a command chain.

FIG. 5 shows an example of a command chain 410. It illustrates a command chain in which a channel requests writing and reading of data as an example of commands and data groups transferred between the channel 340 and the controller 110. The command chain 410 attaches multiple commands, and each command is composed of a command type field 510 and a parameter section 520.

Command type "Define Extent" instructs the range of the input/output processing of a subsequent command, the cache access mode, and so on. Command type "Locate" executes seek and search operations of a target record. Command type "Write" executes writing of the data. The write data is transferred from the data area in the host computer 200 shown by the parameter section 520. Command type "Read" performs the subsequent reading of data. The read data is transferred to a data area (data buffer) in the host computer 200 shown by the parameter section 520.

An extent information designated by the Define Extent command is generally used for the purpose of rejecting the execution of an I/O request if the I/O request based on a subsequent channel command is out of the extent range shown in the parameter section 520. In the present invention, the extent range shown in the parameter section 520 is stored in the extent exclusion control table 420 for the purpose of exclusive control of the virtual volume 390 described later, and also stored in the logical volume extent exclusion control table 425 as the range information during I/O processing of the storage subsystem 100.

FIG. 6 shows a configuration example of the extent exclusion control table 420. The extent exclusion control table 420 is a table for managing the storage subsystem 100 processing the extent range of the virtual volume 390. Each entry of the extent exclusion control table 420 is composed of a virtual storage subsystem field 610, a virtual VOL field 620, an extent range field 630, and a processing storage subsystem field 640.

The virtual storage subsystem field 610 stores the identification information of the virtual storage subsystem 370, and the virtual VOL field 620 stores the identification information of the virtual volume 390. The identification information of the virtual volume 390 may include the identification information of the virtual CU 380. The extent range field 630 stores the extent range information being processed by the storage subsystem 100. The extent range information may be composed, for example, of a beginning cylinder number and track number and a last cylinder number and track number. The processing storage subsystem field 640 stores the identification information of the storage subsystem 100 mainly processing the range within the logical volume 360 corresponding to the extent range shown by the extent range field 630.

Figure 7:
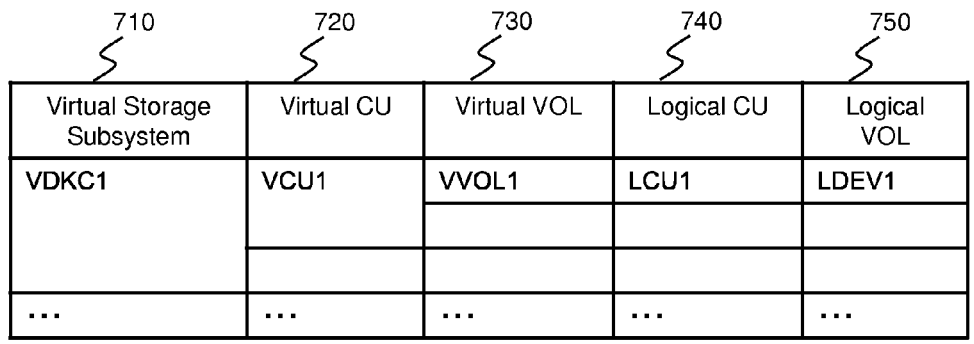
FIG. 7 is a view showing a configuration example of a subsystem ID management table.

FIG. 7 is a view showing the configuration example of the subsystem ID management table 430. The subsystem ID management table 430 is a table for associating the virtual volumes 390 with the logical volumes 360 within the storage subsystem 100 retaining the data. Each entry of the subsystem ID management table 430 is composed of a virtual storage subsystem field 710, a virtual CU field 720, a virtual VOL field 730, a logical CU field 740 and a logical VOL field 750.

The virtual storage subsystem field 710 stores the identification information of the virtual storage subsystem 370, the virtual CU field 720 stores the identification information of the virtual CU 380, and the virtual VOL field 730 stores the identification information of the virtual volume 390. The logical CU field 740 stores the identification information of the logical CU 350 of the storage subsystem 100 allocating the virtual CU 380, and the logical VOL field 750 stores the identification information of the logical volume 360 storing the data of the virtual volume 390.

Figure 8:
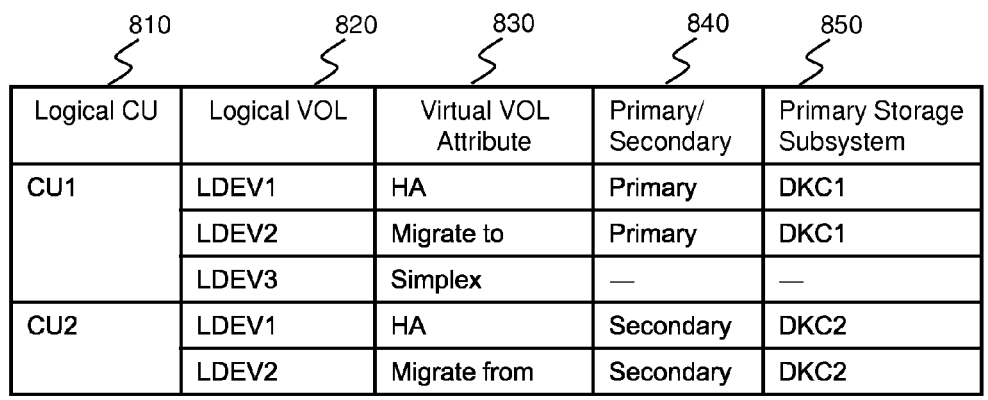
FIG. 8 is a view showing a configuration example of a logical volume management table.

FIG. 8 is a view showing a configuration example of the logical volume management table 440. The logical volume management table 440 is a table for managing the virtualization corresponding status of the logical volume 360. Each entry of the logical volume management table 440 is composed of a logical CU field 810, a logical VOL field 820, a virtual VOL attribute field 830, a primary/secondary field 840, and a primary storage subsystem field 850.

The logical CU field 810 stores the identification information of the logical CU 350 of the storage subsystem 100 retaining the present table 400, and the logical VOL field 820 stores the identification information of the logical volume 360 within the logical CU 350 shown by the logical CU field 810. The virtual VOL attribute field 830 stores the attribute of the virtual volume 390 corresponding to the logical volume 360 shown by the logical VOL field 820. The attribute types include a high availability attribute (HA) showing that the virtual volume is multiplexed via a plurality of storage subsystems 100, a migration destination attribute (Migrate to) or a migration source attribute (Migrate from) showing that the volume is being migrated, and a simplex attribute (Simplex) showing that there is no logical volume 360 associated with the virtual volume 390 in a different storage subsystem 100. The primary/secondary field 840 stores, as the identification information of identifying whether the logical volume is a primary volume or a secondary volume, whether the volume is a primary volume showing the migration source or a secondary volume showing the migration destination of when the volume is migrated, and the primary storage subsystem field 850 stores the identification information of the primary storage subsystem with respect to the relevant logical volume when the attribute is a high availability attribute (HA) or an attribute related to volume migration (Migrate to/Migrate from).

Figure 9:
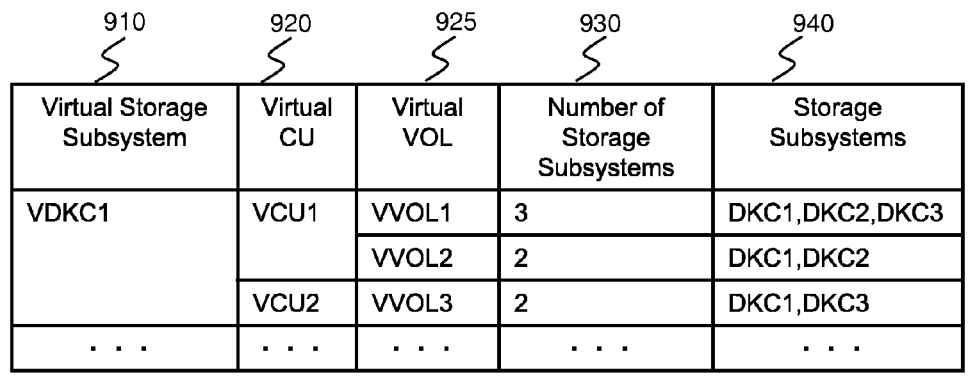
FIG. 9 is a view showing a configuration example of a virtual storage allocation management table.

FIG. 9 is a view showing the configuration example of the virtual storage allocation management table 450. The virtual storage allocation management table 450 is a table for managing the storage subsystem 100 having logical volumes associated with the virtual volumes 390 within the virtual storage subsystem 370. Each entry of the virtual storage allocation management table 450 is composed of a virtual storage subsystem field 910, a virtual CU field 920, a virtual VOL field 925, a storage subsystem number field 930, and a storage subsystem field 940.

The virtual storage subsystem field 910 stores the identification information of the virtual storage subsystem 370, and the virtual CU field 920 stores the identification information of the virtual CU 380. In the present example, the virtual volumes within the virtual CU are allocated collectively to the storage subsystem 100. The virtual VOL field 925 stores the identification information of the virtual volume 390. The storage subsystem number field 930 stores information on how many subsystems 100 exist as allocation destination for allocating the virtual CU 380. The storage subsystem field 940 stores the identification information of the allocation destination storage subsystem 100.

Figure 10:
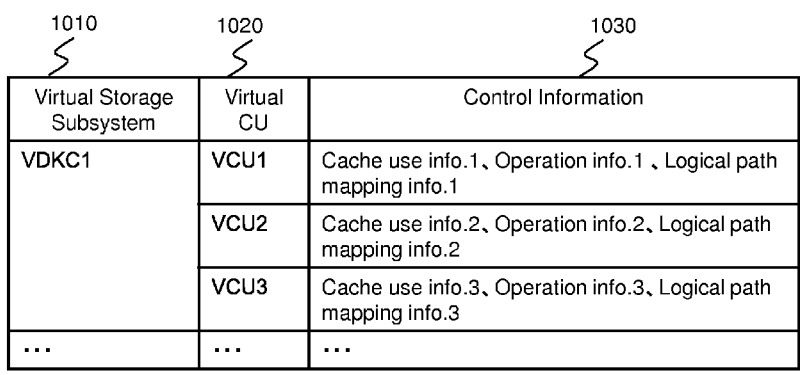
FIG. 10 is a view showing a configuration example of a control information management table.

FIG. 10 is a view showing the configuration example of the control information management table 460. The control information management table 460 is a table for retaining the control information for the virtual storage subsystem 370 that is equivalent to the control information retained in the storage subsystem 100. Each entry of the control information management table 460 is composed of a virtual storage subsystem field 1010, a virtual CU field 1020 and a control information field 1030.

The virtual storage subsystem field 1010 stores the identification information of the virtual storage subsystem 370, and the virtual CU field 1020 stores the identification information of the virtual CU 380. In this example, control information is managed in virtual CU units. The control information field 1030 stores a cache use information, an operation information and a logical path mapping information. The cache use information is a cache control information such as a CFW (cache fast write) ID information and the like. The operation information is a statistical information such as the number of times of execution of I/O processing. The logical path mapping information is the information for controlling the path between the host computer 200 and the storage subsystem 100. In addition, there is an information showing that the execution of I/O processing is put on hold. The control information of the virtual storage subsystem 370 is sent to the host computer 200 using the control information field 1030 according to need.

Figure 18:
FIG. 18 is a view showing a configuration example of a logical volume extent exclusion control table.

FIG. 18 is a view showing a configuration example of a logical volume extent exclusion control table 425. The logical volume extent exclusion control table 425 is a table for managing the storage subsystem 100 for processing the extent range of the logical volume 360. Each entry of the logical volume extent exclusion control table 425 is composed of a logical CU field 1810, a logical VOL field 1820, an extent range field 1830 and a lock status field 1840.

The logical CU field 1810 stores the identification information of the logical CU 350, and the logical VOL field 1820 stores the identification information of the logical volume 360. The extent range field 1830 stores the extent range information of the target being subjected to I/O processing of the storage subsystem 100. The lock status field 1840 stores information on whether or not the extent range shown in the extent range field 1830 is already being accessed (locked) by another I/O processing, wherein "locked" information is stored at a timing when the beginning command of the command chain is being processed, and "unlocked" information is stored by the controller 110 when the above-mentioned processing of the command chain has been completed.

Next, we will describe the procedure of various processes performed by the channel command transfer program 470 according to embodiment 1.

Figure 11:
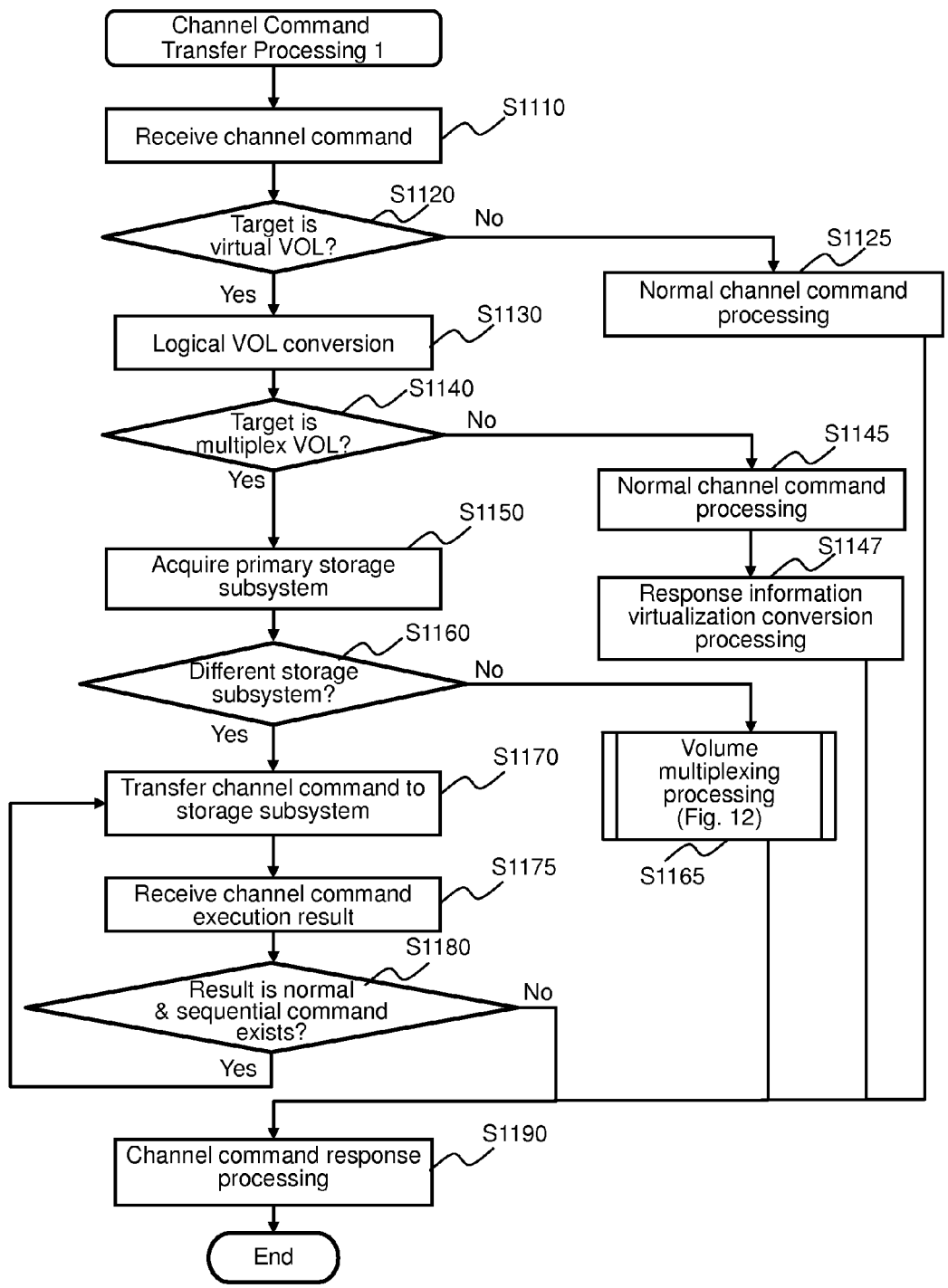
FIG. 11 is a flowchart showing a first procedure of a channel command transfer processing.

FIG. 11 is a flowchart showing a first procedure of a channel command transfer processing. According to the channel command transfer processing, in order to use extent a of the virtual volume 390 exclusively, a command chain composed of a series of channel commands is transferred to the primary storage subsystem controlling the virtual volume 390, and while the primary storage subsystem executes the I/O processing, the result of execution thereof is conformed with the secondary storage subsystem.

At first, the channel command transfer program 470 receives an I/O request from the host computer 200 and also receives a channel command (S1110). At this time, the channel command transfer program 470 acquires the target volume information based on the received information. Whether the target volume is a virtual volume or not is determined based on the subsystem ID management table 430 (S1120). In other words, if the storage subsystem identification information and the CU identification information of the target volume respectively have corresponding entries in the virtual storage subsystem field 710 and the virtual CU field 720, it can be determined that the target volume is a virtual volume.

If it is determined in step S1120 that the target volume is not a virtual volume (No), a channel command processing of a normal volume is executed (S1125).

On the other hand, if it is determined in step S1120 that the target volume is a virtual volume (Yes), the logical volume identification information corresponding to the virtual volume is acquired (S1130). The subsystem ID management table 430 is used for acquiring this information. That is, the logical volume identification information stored in the logical CU field 740 and the logical VOL field 750 are acquired from the entries corresponding to the virtual storage subsystem field 710, the virtual CU field 720 and the virtual VOL field 730 storing the identification information corresponding to the identifier of the target virtual volume.

Next, whether or not the multiple storage subsystems are multiplex volume targets retaining corresponding logical volumes or not is determined (S1140). The determination is performed using the virtual storage allocation management table 450, wherein if multiple storage subsystem information are stored in the storage subsystem field 940 of the entry corresponding to the virtual storage subsystem field 910 and the virtual CU field 920 storing the storage subsystem identification information and the CU identification information of the target volume, it can be determined that the target volume is a multiplex volume.

If it is determined in step S1140 that the target volume is not a multiplex volume target (No), a normal channel command processing is executed targeting the logical volume (S1145). Thereafter, the volume information of the execution result is converted from a logical volume to a virtual volume information, and returned to the command request source (S1147).

On the other hand, if it is determined in step S1140 that the target volume is a multiplex volume target (Yes), a primary storage subsystem information for controlling the virtual volume is acquired (S1150). The logical volume management table 440 is used to acquire this information. That is, the primary storage subsystem information stored in the primary storage subsystem field 850 is acquired from the entry corresponding to the logical CU field 810 and the logical VOL field 820 storing the logical volume identification information.

Next, whether the primary storage subsystem information acquired in step S1150 shows a different storage subsystem or not is determined (S1160). If it is determined in step S1160 that the primary storage subsystem information does not show a different storage subsystem (that it shows the same storage subsystem) (No), a volume multiplexing process S1165 is executed. The process of step S1165 will be described in further detail with reference to FIG. 12.

On the other hand, if it is determined in step S1160 that the primary storage subsystem information shows a different storage subsystem (Yes), the channel command is transferred to the different storage subsystem (S1170). Thereafter, the execution result of the channel command is acquired from the storage subsystem (S1175).

If it is determined in step S1180 that the execution result of the channel command is normal and that the channel command receives commands sequentially via a command chain (Yes), the processes are performed again from step S1170.

On the other hand, if it is determined in step S1180 that the execution result of the channel command is not normal completion or if it is determined that the command chain has ended (No), the procedure returns the execution result of I/O processing to the request source (S1190). Similar to step S1147, if the volume identification information is included in the content being responded, it is converted into a virtual volume identification information.

As described, a command chain composed of a series of channel commands can be transferred to a primary storage subsystem for controlling the virtual volume 390.

Next, we will describe the volume multiplexing process of step S1165.

Figure 12:
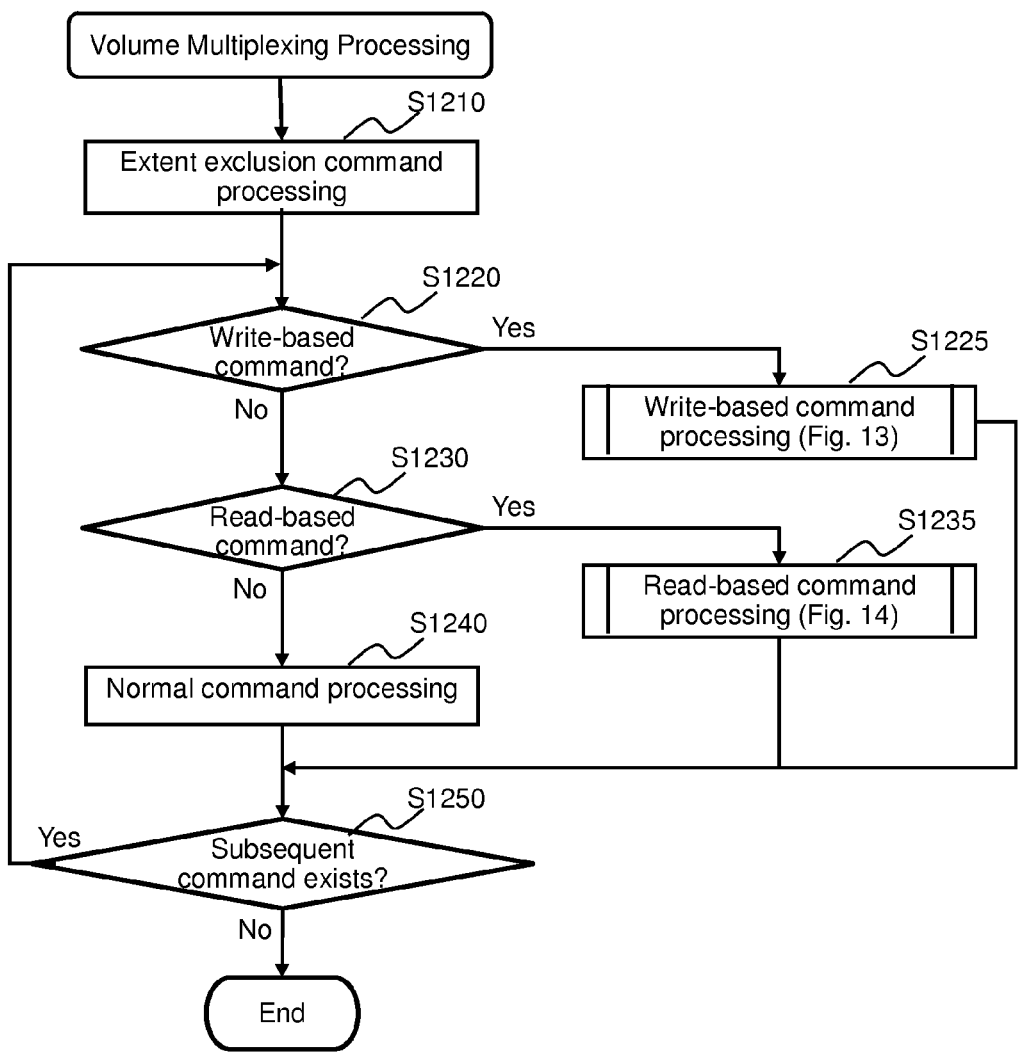
FIG. 12 is a flowchart showing a procedure of a volume multiplexing process.

FIG. 12 is a flowchart showing the procedure of the volume multiplexing process. A volume multiplexing process is a process in which the volume multiplexing program 480 allocates multiple volumes having identical identification information and identical data in multiple storage subsystems.

At first, an extent exclusion instruction included in the beginning channel command is processed (S1210). Here, control is performed based on a normal extent exclusion processing so that the designated extent range will not be accessed by other I/O requests. Actually, a "locked" information is stored in the lock status field 1840 of the logical volume extent exclusion control table 425.

Next, whether the channel command is a write-based command or not is determined (S1220). If it is determined in step S1220 that the channel command is a write-based command (Yes), a write-based command processing is executed (S1225). The process of step S1225 will be described in detail with reference to FIG. 13.

If it is determined in step S1220 that the command is not a write-based command (No), it is further determined whether the channel command is a read-based command or not (S1230). If it is determined in step S1230 that the channel command is a read-based command (Yes), a read-based command processing is executed (S1235). The processing of step S1235 will be described in detail with reference to FIG. 14.

If it is determined in step S1230 that the command is not a read-based command (No), a normal command processing is executed (S1240).

After executing the processes regarding the command, the procedure determines whether or not there is a subsequent command in the command chain (S1250). If it is determined that there is a subsequent command (Yes), the processing is repeatedly performed from step S1220, and if it is determined that there is no subsequent command (No), the processing is ended.

Next, we will describe the write-based command processing of step S1225.

Figure 13:
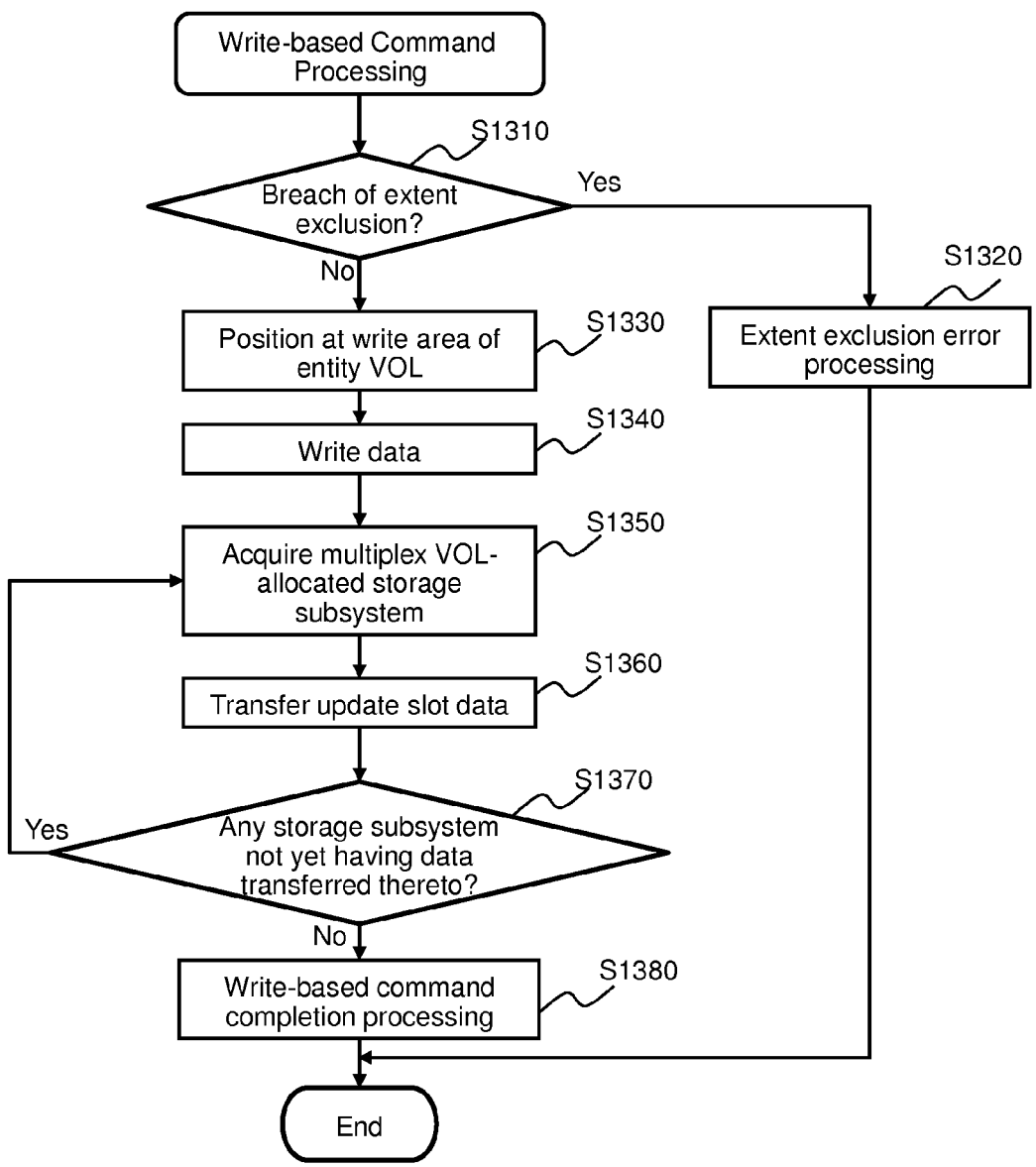
FIG. 13 is a flowchart showing a procedure of a write-based command processing.

FIG. 13 is a flowchart showing the procedure of the write-based command processing. At first, whether the write range of the write-based command does not breach the extent exclusion or not is determined (S1310). This determination is performed by checking whether the access authority to the extent range of the virtual volume is already given to a different I/O processing or not using the logical volume extent exclusion control table 425.

In step S1310, if the lock status field 1840 of the logical volume extent exclusion control table 425 is set to "locked" regarding the extent range being accessed via the write command, it is determined that the access authority of the range is given to another I/O processing (Yes), and an extent exclusion error processing is executed (S1320).

On the other hand, if it is determined that the access authority is given to the present I/O processing (No), the disk device is positioned at a write area of the logical volume being the entity of the virtual volume (S1330). Thereafter, the data designated by the write command is written into the disk device (S1340). However, steps S1330 and S1340 may be performed targeting a cache memory instead of the disk device, and the writing of data to the disk device can be performed asynchronously.

Next, the procedure acquires the information of the storage subsystem having allocated thereto the multiplex volume retaining the entity of the virtual volume (S1350). At this time, the procedure refers to the virtual storage allocation management table 450.

Thereafter, the data of the updated slot including the data written in step S1340 is transferred to the storage subsystem acquired in step S1350 (S1360).

Next, the procedure determines whether there are other multiplex volume-allocated storage subsystems to which data has not yet been transferred (S1370). If it is determined that there are other multiplex volume-allocated storage subsystems to which data has not yet been transferred (Yes), the processing is repeated from step S1350. On the other hand, if it is determined that data has been transferred to all the multiplex volume-allocated storage subsystems (No), the completion processing of the write-based command is executed (S1380). Step S1380 is a process of setting a command execution result code, for example.

Next, the read-based command processing of step S1235 will be described.

Figure 14:
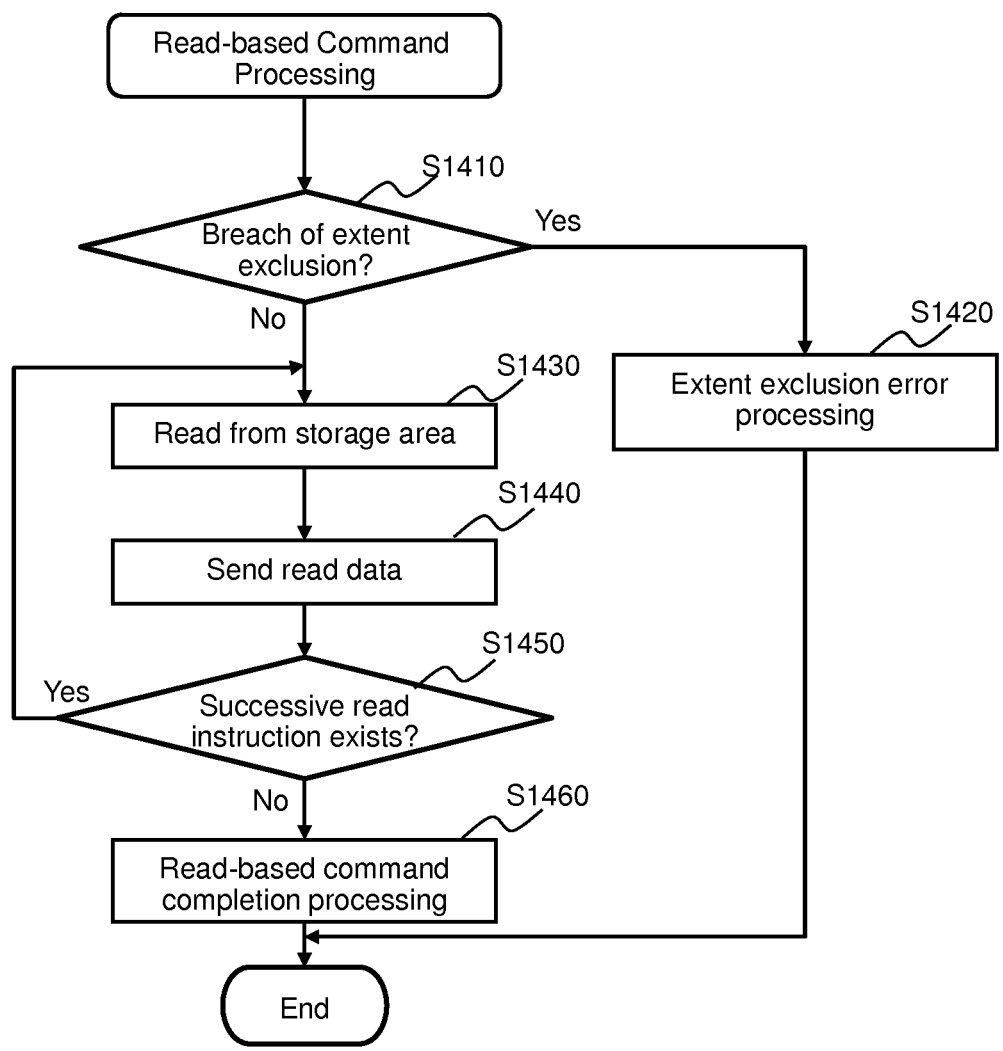
FIG. 14 is a flowchart showing a procedure of a read-based command processing.

FIG. 14 is a flowchart showing the procedure of a read-based command processing. At first, the procedure determines whether the read range of the read-based command does not breach extent exclusion (S1410). For this determination, the procedure checks whether the access authority to the extent range with respect to the virtual volume is already given to a different I/O processing or not, similar to the aforementioned write-based command processing. If it is determined that the access authority is already given to another I/O processing (Yes), the procedure executes an extent exclusion error processing (S1420).

On the other hand, if it is determine that the present I/O processing has the access authority (No), the procedure reads the data designated by the read-based command from the disk device or the cache memory (S1430). Next, the data read in step S1430 is transmitted to the transfer source storage subsystem of the read-based command (S1440).

Next, if successive reading of data is instructed by the read-based command (Yes), the processing is repeated from step S1430 (S1450). On the other hand, if successive reading of data is not instructed (No), a completion processing of the read-based command is executed (S1460). Step S1460 can be, for example, a process of setting a command execution result code.

As described, according to embodiment 1, an identical identification information is given to logical volumes of multiple storage subsystems, and a single virtual volume is composed of the logical volumes having identical identification information. Then, virtual volumes can be subjected to extent exclusion and used simultaneously by multiple host computers.

Embodiment 2

If the attribute value in the virtual VOL attribute field 830 of the logical volume management table 440 is volume migration (Migrate to/Migrate from), the control information of the storage subsystem prior to migration must be taken over to the migration destination. Thus, the process for matching the control information among storage subsystems having the entity of the virtual volume will be illustrated hereafter as embodiment 2.

Figure 15:
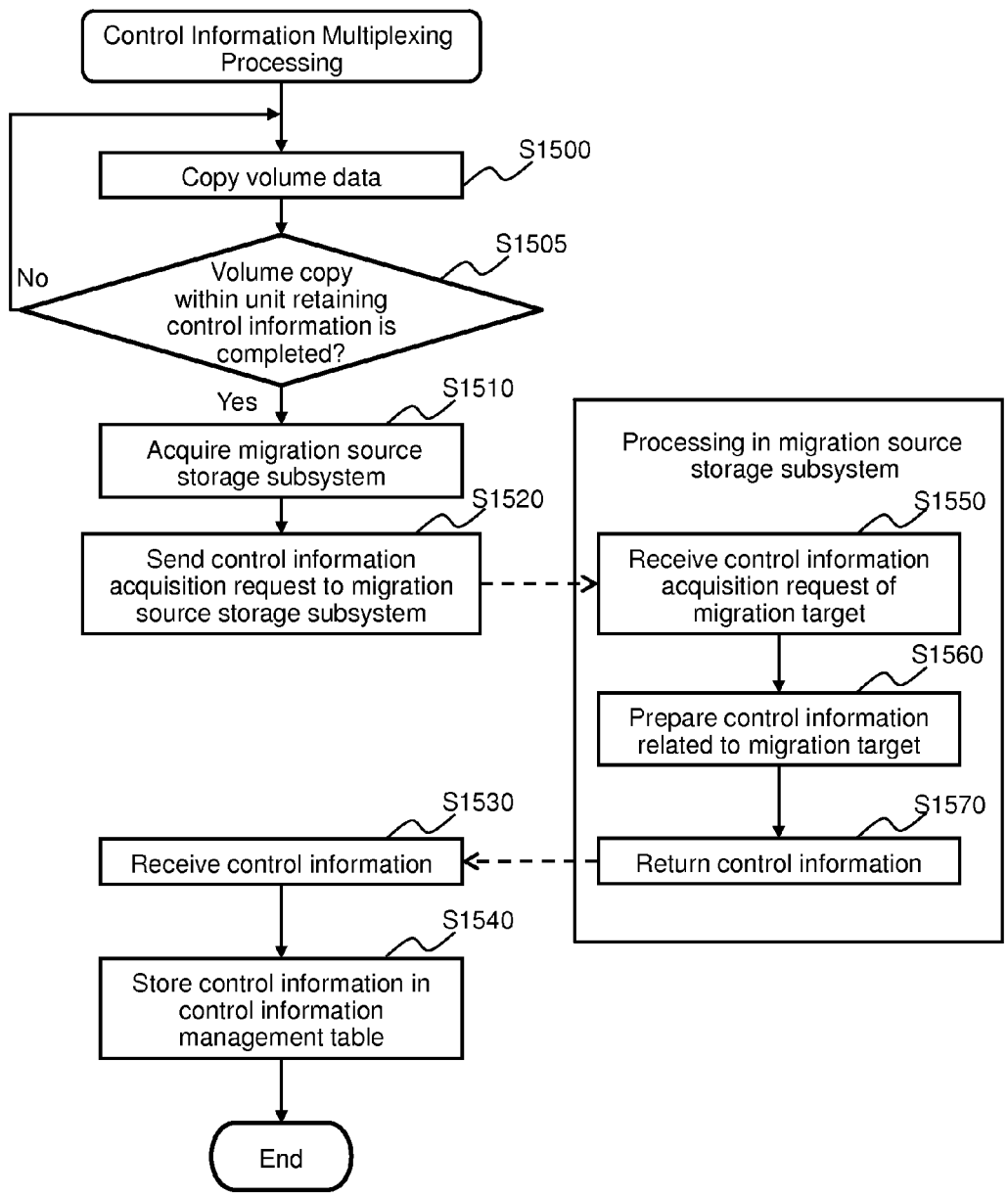
FIG. 15 is a flowchart showing a procedure of a control information multiplexing process.

FIG. 15 is a flowchart showing the procedure of the control information multiplexing process. When volume migration is actuated, the data within the migration target volume is copied to the migration destination (S1500). In embodiment 2, the data in the migration source volume is read from the migration destination storage subsystem, and stored in the migration destination volume. Control information includes information retained for each virtual CU. Thus, whether volume copy within the virtual CU of the migration destination has been completed or not is determined (S1505), and if copy has been completed (Yes), the control information multiplexing process will be activated.

Next, the information of the migration source storage subsystem having the virtual CU to be taken over is acquired (S1510). Here, the value in the primary storage subsystem field 850 of the logical volume management table 440 is used. The controller deletes the value in the primary storage subsystem field 850 when the volume migration processing is completed, and at the same time, changes the information of the virtual VOL attribute field 830 to "Simplex".

Thereafter, a control information acquisition request is sent to the migration source storage subsystem (S1520). When the migration source storage subsystem receives the control information acquisition request of the migration target (S1550), it prepares the control information related to the migration target (S1560). This is realized by the controller of the migration source storage subsystem extracting the control information related to the requested migration target from the control information management table 460. In embodiment 2, it is assumed that the control information specified by the identification information of the virtual CU is stored in the control information field 1030 of the control information management table 460.

Next, the migration source storage subsystem returns a predetermined control information (S1570), which is received by the request source storage subsystem (S1530). Then, the received control information is stored in the control information management table 460 of the request source storage subsystem (S1540).

Thus, according to embodiment 2, it becomes possible to match the control information related to the virtual volume among multiple storage subsystems controlling the virtual volume.

Embodiment 3

The storage system according to embodiment 3 of the invention constitutes the virtual volume according to embodiment 1, wherein when a virtual volume is subjected to extent exclusion and used simultaneously by multiple host computers, only the beginning channel command including the designation of the extent exclusion is exchanged among storage subsystems, and the other channel commands are executed only within the storage subsystem having received the I/O request from the host computer.

Figure 16:
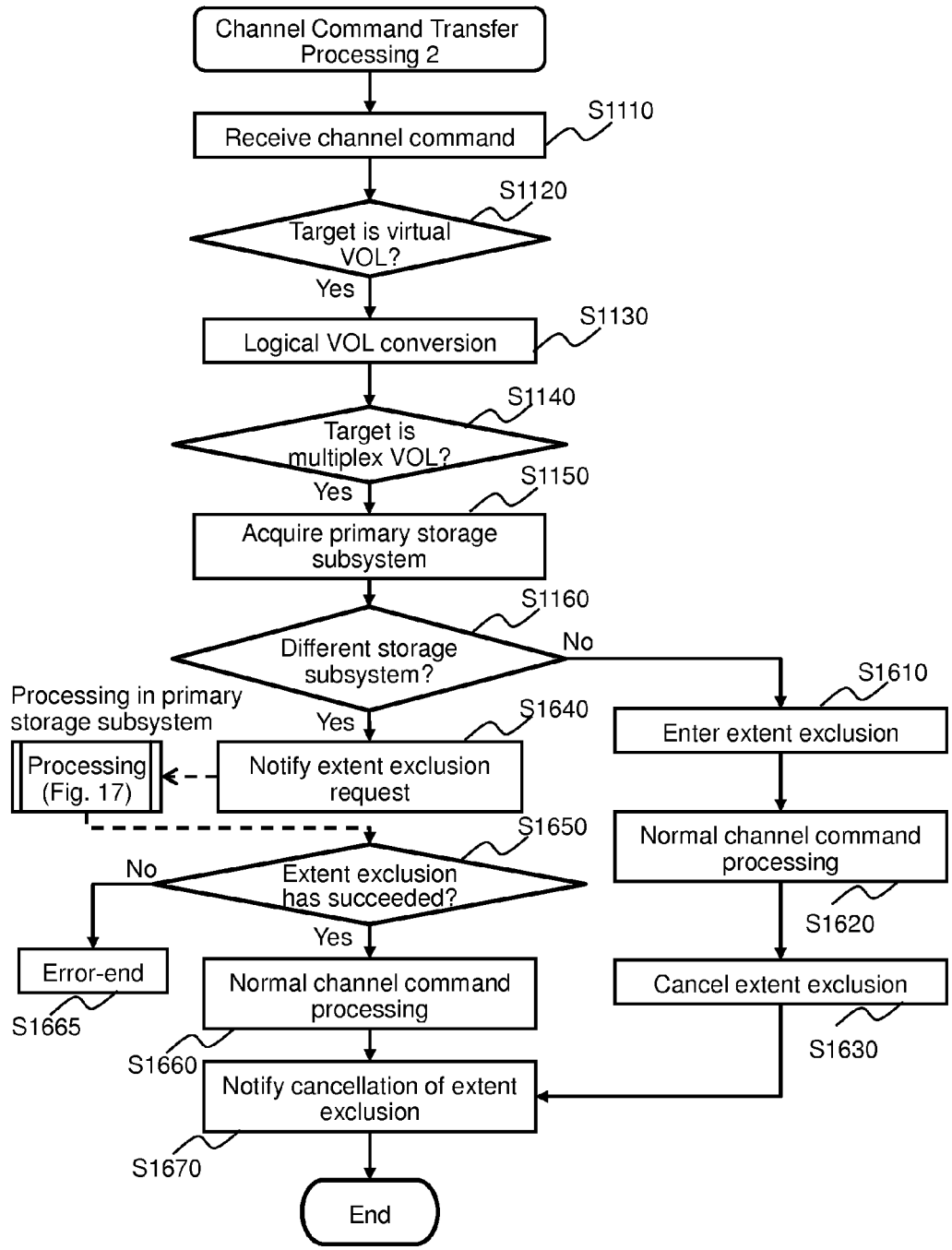
FIG. 16 is a flowchart showing a second procedure of a channel command transfer processing.

FIG. 16 is a flowchart showing a second procedure of the channel command transfer processing. The second procedure of the channel command transfer processing is a processing performed by the channel command transfer program 470, wherein the processes of steps S1110 through S1160 are the same as the processes of steps S1110 through S1160 of FIG. 11 illustrating embodiment 1. Therefore, the description of the present embodiment is started from step S1160.

If it is determined in step S1160 that the primary storage subsystem controlling the virtual volume is not in a different storage subsystem (that is, its own storage subsystem) (No), the procedure executes entering of the extent exclusion (S1610). In the present example, the extent range is entered in the extent range field 630 in the entry of the corresponding virtual volume of the extent exclusion control table 420, and the identification information of the own storage subsystem is entered in the processing storage subsystem field 640.

Next, a normal channel command processing is performed (S1620), and thereafter, cancelling of the extent exclusion is performed (S1630). In the present example, the extent range is deleted from the extent range field 630 in the entry of the corresponding virtual volume in the extent exclusion control table 420, and the identification information of the own storage subsystem is deleted from the processing storage subsystem field 640.

On the other hand, if it is determined that the primary storage subsystem controlling the virtual volume is a different storage subsystem in step 1160 (Yes), the extent exclusion request is notified to that primary storage subsystem (S1640). The extent exclusion processing performed by the primary storage subsystem having received the extent exclusion request will be described later with reference to FIG. 17.

Thereafter, the result of the extent exclusion request is received from the primary storage subsystem to determine whether extent exclusion has succeeded or not (S1650). If it is determined in step S1650 that extent exclusion has failed (No) due for example to an earlier designation of extent exclusion from another I/O request, the process is error-ended (S1665).

On the other hand, if it is determined that extent exclusion has succeeded (Yes) in step S1650, a normal channel command processing is executed (S1660). Then, when the series of channel command processing has ended, the cancellation of extent exclusion is notified to the primary storage subsystem (S1670).

Figure 17:
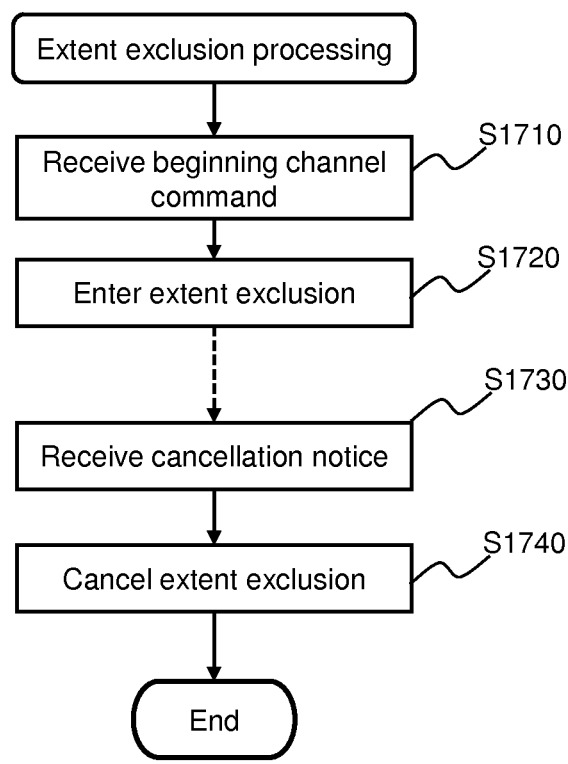
FIG. 17 is a flowchart showing a procedure of an extent exclusion processing.

FIG. 17 is a flowchart showing the procedure of extent exclusion processing by the extent exclusion processing program 495. The processing performed by the primary storage subsystem having received the notification of step S1640 of the channel command transfer processing illustrated in FIG. 16 will be described with reference to FIG. 17.

A beginning channel command is received together with the notification of the extent exclusion entry (S1710). Thereafter, the extent exclusion is entered (S1720). Also according to this example, the extent range is entered to the extent range field 630 of the entry of the corresponding virtual volume of the extent exclusion control table 420, and the identification information of the transmission source storage subsystem is entered to the processing storage subsystem field 640.

Then, the procedure enters standby until an extent exclusion cancellation notice is received. During this time, when a different I/O request is received, the procedure checks the entered information in the extent exclusion control table 420, and if access to the extent range is requested, it returns an error response.

When an extent exclusion cancellation notice is received (S1730), the extent exclusion is cancelled (S1740). In the present example, the extent range is deleted from the extent range field 630 in the entry of the relevant virtual volume of the extent exclusion control table 420, and the identification information of the storage subsystem is deleted from the processing storage subsystem field 640.

As described, according to embodiment 3, when a virtual volume is subjected to extent exclusion and used simultaneously by multiple host computers, only the beginning channel command including the designation of extent exclusion is exchanged among storage subsystems, and other channel commands are executed within the storage subsystem having received the I/O request from the host computer.

REFERENCE SIGNS LIST

1 Computer system
100 Storage subsystem
102, 104 Network
200 Host computer
340 Channel
350 Logical control unit (logical CU)
360 Logical volume
370 Virtual storage subsystem
380 Virtual control unit (Virtual CU)
390 Virtual volume
400 Microprogram
410 Command chain
420 Extent exclusion control table
430 Subsystem ID management table
440 Virtual volume management table
450 Virtual storage allocation management table
460 Control information management table
470 Channel command transfer program
480 Volume multiplexing program
490 Control information multiplexing program
495 Extent exclusion processing program

The invention claimed is:

1. A plurality of storage subsystems connected via a network to a plurality of mainframe host computers, comprising multiplex volumes provided with identical identification information among the plurality of storage subsystems as volume identification information provided to the host computers;

wherein the plurality of storage subsystems comprises, at least, a first storage subsystem for executing an extent exclusion processing with respect to the multiplex volume and a second storage subsystem other than the first storage subsystem, and control units provided to the respective subsystems;

wherein the host computer transmits a channel command requesting input/output processing of data by a command chain configuration; and wherein the control unit of any of the plurality of storage subsystems obtain information on the multiplex volume being a target of the input/output processing from a beginning channel command of the command chain, if itself is the first storage subsystem, then executes the extent exclusion processing as well as an input/output processing by a subsequent command of the beginning channel command, with respect to the multiplex volume being the target of the input/output processing, and cancels the extent exclusion after the execution; and if itself is the second storage subsystem, then requests the extent exclusion processing with respect to the multiplex volume being the target of the input/output processing to the first storage subsystem, receives a result of the exclusion processing, executes an input/output processing with respect to the multiplex volume by a subsequent command of the beginning channel command based on the result, and notifies cancel of the extent exclusion to the first storage subsystem after the execution.

2. The storage subsystem according to claim 1, wherein the plurality of storage subsystems comprise a first table which stores at least information of the first storage subsystem with respect to an extent range of the multiplex volume, and the control unit of any of the plurality of storage subsystems determines whether itself is the first or the second storage subsystem with the first table.

3. The storage subsystem according to claim 2, wherein the plurality of storage subsystems comprise a second table which stores at least information of an extent range of the multiplex volume and the storage subsystem which processes the range, and the control unit of the first storage subsystem registers the extent range related to the extent exclusion processing and the storage subsystem which executes the input/output processing regarding the extent range, concerning the input/output processing, to the second table.

4. A data management method executed by any of a plurality of storage subsystems connected via a network to a plurality of mainframe host computers, the plurality of storage subsystems having multiplex volumes provided with identical identification information among the plurality of storage subsystems as volume identification information provided to the host computers, and the plurality of storage subsystems are composed of, at least, a first storage subsystem for executing an extent exclusion processing with respect to the multiplex volume and a second storage subsystem other than the first storage subsystem, the data management method comprising the steps of:

a first step of receiving the channel command requesting input/output processing of data by a command chain configuration from the host computer;

a second step of obtaining information on the multiplex volume being a target of the input/output processing from a beginning channel command of the command chain;

a third step of determining whether itself is the first storage subsystem or the second storage subsystem;

a fourth step of, if itself is the first storage subsystem, executing the extent exclusion processing as well as an input/output processing by a subsequent command of the beginning channel command, with respect to the multiplex volume being the target of the input/output processing, and cancelling the extent exclusion after execution; and a fifth step of, if itself is the second storage subsystem, requesting the extent exclusion processing with respect to the multiplex volume being the target of the input/output processing to the first storage subsystem, receiving a result of the exclusion processing, executing an input/output processing by a subsequent command of the beginning channel command with respect to the multiplex volume based on the result, and notifying cancel of the extent exclusion to the first storage subsystem after execution;

wherein the fifth step includes a step by the first storage subsystem of executing the extent exclusion processing, and notifying the execution result to the second storage subsystem as a request source.

5. The data management method according to claim 4, wherein the determination in the third step is performed by a first table which stores at least information of the first storage subsystem with respect to an extent range of the multiplex volume.

6. The data management method according to claim 5, wherein the extent exclusion processing in the fourth or the fifth step includes registering an extent range related to the extent exclusion processing and the storage subsystem which executes the input/output processing regarding the extent range, to a second table which stores at least information of the extent range of the multiplex volume and the storage subsystem which processes the range.

* * * * *